(12) United States Patent
McNaughton et al.

(10) Patent No.: US 10,045,099 B2
(45) Date of Patent: *Aug. 7, 2018

(54) SYSTEM AND METHOD FOR PROVIDING MULTI-PROVIDER TELECOMMUNICATIONS SERVICES OVER A PASSIVE OPTICAL NETWORK

(71) Applicant: CenturyLink Intellectual Property LLC, Denver, CO (US)

(72) Inventors: James Lloyd McNaughton, Lenexa, KS (US); Randall Lee Markway, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,346

(22) Filed: Dec. 9, 2015

(65) Prior Publication Data

US 2016/0094901 A1    Mar. 31, 2016

Related U.S. Application Data

(63) Continuation of application No. 13/689,384, filed on Nov. 29, 2012, now Pat. No. 9,236,944, which is a (Continued)

(51) Int. Cl.
*H04J 14/00* (2006.01)
*H04Q 11/00* (2006.01)
(Continued)

(52) U.S. Cl.
CPC ......... *H04Q 11/0067* (2013.01); *H04B 10/25* (2013.01); *H04L 12/1471* (2013.01); *H04L 12/66* (2013.01); *H04Q 2011/0079* (2013.01)

(58) Field of Classification Search
CPC ..... H04L 12/1471; H04L 12/66; H04B 10/25; H04Q 11/0067; H04Q 2011/0079
(Continued)

(56) References Cited

U.S. PATENT DOCUMENTS 6,011,637 A     1/2000  Pfeiffer
6,490,443 B1 *  12/2002 Freeny, Jr. ............. G06Q 20/32
                                                       455/406

(Continued)

OTHER PUBLICATIONS

Reconfigurable optical add-drop mulitplexer, http://en.wikipedia.org/wiki/Reconfigurable_optical_add-drop_multiplexer, Printed Dec. 15, 2009.
(Continued)

*Primary Examiner* — Amritbir Sandhu
(74) *Attorney, Agent, or Firm* — Swanson & Bratschun, L.L.C.

(57) ABSTRACT

A method for providing access to a passive optical network for services to homes or businesses from two or more telecommunications service providers and a billing means is described. A first service provider connects to a point of presence at one side of passive optical network. The provider transmits the appropriate services through this network to an authorization receiver. The authorization receiver is used to receive a periodic authorization code from the network provider to enable the appropriate services from the service provider to be transmitted to a subscriber at a home or business. The authorization receiver enables an optical fiber path to be established for the services to flow to and from the home or business. The authorization code that is transmitted through the network also provides an unambiguous means to provide a billing record such that the service provider can be billed by the network provider on an individual service address connected basis in conjunction with a record of houses passed and not yet connected.

20 Claims, 4 Drawing Sheets

Related U.S. Application Data continuation of application No. 12/632,215, filed on Dec. 7, 2009, now Pat. No. 8,346,095.

(51) Int. Cl.
*H04L 12/14* (2006.01)
*H04L 12/66* (2006.01)
*H04B 10/25* (2013.01)

(58) Field of Classification Search
USPC ...... 398/45, 58, 168, 43, 68, 70, 71, 98–100
See application file for complete search history.

(56) References Cited

U.S. PATENT DOCUMENTS

| | | | |
|---|---|---|---|
| 6,611,198 B1* | 8/2003 | Geiszler | G06K 7/0008 340/10.1 |
| 6,711,135 B1 | 3/2004 | Dziekan et al. | |
| 6,782,080 B2 | 8/2004 | Leivo et al. | |
| 7,076,167 B2 | 7/2006 | Kim | |
| 7,528,844 B2 | 5/2009 | Deschamp | |
| 7,609,967 B2* | 10/2009 | Hochbaum | H04J 14/0226 398/100 |
| 7,794,157 B2 | 9/2010 | Hudgins | |
| 7,889,670 B2* | 2/2011 | Casey | H04M 11/062 370/252 |
| 7,899,032 B1 | 3/2011 | Afshar et al. | |
| 8,024,752 B2* | 9/2011 | Duffield | H04N 7/163 725/25 |
| 8,346,095 B2* | 1/2013 | McNaughton | H04L 12/1471 379/93.02 |
| 8,364,970 B2* | 1/2013 | Fu | G06F 21/6218 713/185 |
| 8,391,278 B2* | 3/2013 | Preis | H04Q 3/0025 370/352 |
| 8,655,174 B2 | 2/2014 | Zhu | |
| 8,824,890 B2* | 9/2014 | Lee | H04J 14/0239 398/58 |
| 8,849,108 B2 | 9/2014 | Pradzynski | |
| 9,071,569 B1* | 6/2015 | Jacobs | H04L 63/102 |
| 9,236,944 B2* | 1/2016 | McNaughton | H04L 12/1471 |
| 9,319,413 B2* | 4/2016 | Kim | H04W 4/70 |
| 9,749,052 B2* | 8/2017 | Xu | H04B 10/27 |
| 9,866,917 B2* | 1/2018 | Goergen | H04N 21/4882 |
| 2002/0052830 A1* | 5/2002 | Sakamoto | G06Q 30/02 705/37 |
| 2002/0052915 A1 | 5/2002 | Amin-Salehi | |
| 2003/0084283 A1* | 5/2003 | Pixton | H04H 20/26 713/163 |
| 2003/0128987 A1 | 7/2003 | Mayer | |
| 2004/0033075 A1 | 2/2004 | Koch | |
| 2004/0039807 A1 | 2/2004 | Boveda De Miguel et al. | |
| 2004/0141747 A1 | 7/2004 | Kenny et al. | |
| 2004/0181602 A1* | 9/2004 | Fink | H04L 63/10 709/229 |
| 2005/0002335 A1* | 1/2005 | Adamczyk | H04L 63/102 370/230 |
| 2005/0002396 A1 | 1/2005 | Gyetko | |
| 2005/0129030 A1 | 6/2005 | Choi et al. | |
| 2005/0138670 A1 | 6/2005 | Ploumen | |
| 2005/0172329 A1 | 8/2005 | Kim et al. | |
| 2006/0176835 A1* | 8/2006 | Jang | H04H 20/02 370/270 |
| 2007/0044146 A1* | 2/2007 | Murase | G06F 21/33 726/10 |
| 2007/0073880 A1* | 3/2007 | Krishnakumar | H04L 63/0807 709/225 |
| 2008/0019693 A1* | 1/2008 | Sorin | H04Q 11/0067 398/71 |
| 2008/0113661 A1* | 5/2008 | Repka | H04M 3/42289 455/418 |
| 2008/0167948 A1* | 7/2008 | Park | G06Q 30/02 705/7.33 |
| 2009/0047016 A1 | 2/2009 | Bernard et al. | |
| 2009/0067840 A1* | 3/2009 | Bernard | H04J 14/0226 398/67 |
| 2009/0085806 A1* | 4/2009 | Piersol | G01C 21/206 342/386 |
| 2009/0110392 A1 | 4/2009 | Walid | |
| 2009/0154924 A1 | 6/2009 | Liu | |
| 2009/0154925 A1* | 6/2009 | Chen | H04J 14/0282 398/58 |
| 2009/0162063 A1 | 6/2009 | Mizutani et al. | |
| 2009/0185804 A1 | 7/2009 | Kai et al. | |
| 2009/0313476 A1* | 12/2009 | Liu | H04L 63/10 713/182 |
| 2010/0001058 A1* | 1/2010 | Grovit | G06Q 20/02 235/375 |
| 2010/0054740 A1 | 3/2010 | Lee et al. | |
| 2010/0180000 A1 | 7/2010 | Cacheria et al. | |
| 2010/0269146 A1 | 10/2010 | Britt | |
| 2010/0290782 A1* | 11/2010 | Lee | H04B 10/272 398/58 |
| 2010/0322626 A1 | 12/2010 | Kim et al. | |
| 2011/0038629 A1 | 2/2011 | Johansson et al. | |
| 2011/0058657 A1 | 3/2011 | Alegret et al. | |
| 2011/0072475 A1* | 3/2011 | McKiel, Jr. | H04N 7/17318 725/100 |
| 2011/0135074 A1* | 6/2011 | McNaughton | H04L 12/1471 379/93.02 |
| 2011/0153756 A1* | 6/2011 | Angle | H04L 51/14 709/206 |
| 2011/0167268 A1* | 7/2011 | Baykal | H04L 63/08 713/169 |
| 2011/0317995 A1 | 12/2011 | Zheng | |
| 2012/0005133 A1 | 1/2012 | Patel | |
| 2012/0162013 A1* | 6/2012 | Piersol | G01S 5/0236 342/386 |
| 2012/0163374 A1 | 6/2012 | Shah | |
| 2012/0288278 A1* | 11/2012 | Chen | G02B 6/125 398/58 |
| 2012/0315040 A1 | 12/2012 | Dahlfort | |
| 2013/0016974 A1* | 1/2013 | Zheng | H04J 14/0249 398/72 |
| 2013/0089188 A1 | 4/2013 | McNaughton et al. | |
| 2015/0037033 A1* | 2/2015 | Jain | H04Q 11/0067 398/58 |
| 2015/0288825 A1 | 10/2015 | Cook | |
| 2016/0360302 A1* | 12/2016 | Noll | H04Q 11/0067 |

OTHER PUBLICATIONS

U.S. Appl. No. 12/632,215; Issue Notification dated Dec. 12, 2012; 1 page.
U.S. Appl. No. 12/632,215; Non Final Office Action dated Feb. 1, 2012; 20 page.
U.S. Appl. No. 12/632,215; Notice of Allowability dated Oct. 22, 2012; 8 pages.
U.S. Appl. No. 12/632,215; Notice of Allowance dated Aug. 29, 2012; 22 pages.
U.S. Appl. No. 13/689,384; Final Rejection dated Dec. 26, 2014; 35 pages.
U.S. Appl. No. 13/689,384; Final Rejection dated Dec. 5, 2013; 31 pages.
U.S. Appl. No. 13/689,384; Issue Notification dated Dec. 22, 2015; 1 page.
U.S. Appl. No. 13/689,384; Non-Final Rejection dated Apr. 9, 2015; 34 pages.
U.S. Appl. No. 13/689,384; Non-Final Rejection dated May 21, 2013; 31 pages.
U.S. Appl. No. 13/689,384; Non-Final Rejection dated Jun. 16, 2014; 32 pages.
U.S. Appl. No. 13/689,384; Notice of Allowance dated Sep. 8, 2015; 24 pages.
U.S. Appl. No. 13/689,384; Notice of Panel Decision dated Mar. 20, 2014; 2 pages.
What is ROADM (reconfigurable optical add-drop multiplexer)?, Search Telecom.com Definitions, ROADM, http://searchtelecom.techtarget.com/sDefinition/0,,sid103_gci1264789. . . .

(56) References Cited

OTHER PUBLICATIONS

U.S. Appl. No. 14/586,279; Non-Final Rejection dated Sep. 21, 2017; 24 pages.
U.S. Appl. No. 14/586,279; Notice of Allowance dated Nov. 30, 2017; 14 pages.

* cited by examiner

SYSTEM AND METHOD FOR PROVIDING MULTI-PROVIDER TELECOMMUNICATIONS SERVICES OVER A PASSIVE OPTICAL NETWORK

CROSS REFERENCE TO RELATED APPLICATION

This application is a continuation of U.S. patent application Ser. No. 13/689,384 filed Nov. 29, 2012 by James Lloyd McNaughton et al. titled, "System and Method for Providing Multi-Provider Telecommunications Services Over a Passive Optical Network", which is a continuation of U.S. patent application Ser. No. 12/632,215, filed Dec. 7, 2009 by James Lloyd McNaughton et al. titled, "System and Method for Providing Multi-Provider Telecommunications Services Over a Passive Optical Network", both of which are hereby incorporated by reference in its entirety.

TECHNICAL FIELD OF THE INVENTION

The present disclosure relates generally to the delivery of residential and business telecommunications services, and in particular, to a passive optical network for use by multiple telecommunications providers.

BACKGROUND OF THE INVENTION

Telecommunications providers build very expensive networks in order to provide voice, data, video and other services to homes and businesses. Cable television companies, for instance, build Hybrid Fiber Coax (HFC) networks to provide voice, data, and video services to customers using Radio Frequency (RF) technology and Frequency Division Multiplexing (FDM) sharing schemes. Services are broadcast over these networks from a cable television headend and then demultiplexed, demodulated, and decoded as necessary by electronics located on the side of the house or business or within the building. These networks can cost several thousands of dollars per subscriber to build.

Telephone companies use Gigabit Passive Optical Networks (GPON) to deliver voice, data, and video services to homes and businesses. Services are typically broadcast over a single optical fiber to an optical splitter. The splitter divides the power among several individual fibers which transmit these services to electronic units located on the side of or within a building. These electronic units must demultiplex, demodulate, and decode the transmitted signals as necessary to deliver the appropriate services to the individual subscribers. This type of network can also cost several hundred to several thousands of dollars per subscriber to build and operate.

As technology, market conditions, and federal and state regulation has evolved, an economic inefficiency has been created resulting in network providers passing multiple sites, and serving only one, with the cost passed on primarily to the mass market of residential and small business users. In addition, discriminatory investment spending to upgrade networks, along with a lack of corporate investment in a recognized optimal fiber network solution, is being observed as the United States falls behind other countries in the percent of sites served with an end to end fiber solution.

In order to save capital costs and operating fees, and to achieve the "broadband for all" goal for the common good, the services from different network providers can be sent over the same passive optical network. However, an effective and reliable sharing scheme needs to be developed in order for carriers to commit to placing their services over a shared network. Another problem with a typical shared network arrangement is that the manual switching devices used to connect or disconnect a customer service feed can be easily tampered with and do not provide remote monitoring of unauthorized usage for the individual service providers. A need therefore exists for an improved system and method for allowing multiple service providers to distribute services using the same network infrastructure.

SUMMARY OF THE DISCLOSURE

In certain embodiments, a network for delivering telecommunications services comprises a point of presence unit maintained by a network provider for receiving service provider signals from at least two service providers. A plurality of authorization receivers are respectively associated with a plurality of user premises, with each authorization receiver comprising at least one optical switch. A passive optical network is connected between the point of presence, and the optical switch in each authorization receiver. The point of presence transmits a first service provider signal and a first plurality of authorization codes over the passive optical network to the plurality of authorization receivers. The point of presence also transmits the second service provider signal and a second plurality of authorization codes over the passive optical network to the plurality of authorization receivers. Each one of the authorization receivers allows the first service provider signal to be connected to the corresponding user premises if at least one of the first plurality of authorization codes matches an authorization code associated with the corresponding authorization receiver. Likewise, each one of the plurality of authorization receivers allows the second service provider signal to be connected to the user premises if at least one of the second plurality of authorization codes matches an authorization code associated with the corresponding authorization receiver. The network provider maintains a record of all connections and disconnections of the first and second service provider signals to and from the user premises and provides the record to the individual service providers. In certain embodiment, each service provider signal is transmitted over a separate optical fiber path within the passive optical network to a separate optical switch in each authorization receiver.

In other embodiments, a method for providing telecommunications services over a network comprises the acts of providing a point of presence unit for receiving service provider signals from at least two service providers. A first and second service provider signal are respectively received from a first and second service provider. If the received signals are not already in an optical transmission format, they are converted into an optical transmission format. The first and second service provider signals are respectively transmitted over a passive optical network to a plurality of authorization receivers. Each authorization receiver is associated with an authorization code for each service provider, although in certain embodiments, the same authorization code may be used for both service providers. If the received authorization code matches the code associated with the authorization receiver, the associated service provider signal is allowed to pass from the authorization receiver to the equipment in the user premises. Again, the network provider maintains records of all connections and disconnections of the various service provider signals to and from the user premises. Each service provider receives detailed billing information concerning the connections and disconnections for their respective signals.

DETAILED DESCRIPTION OF THE PREFERRED EMBODIMENTS

Figure 1:
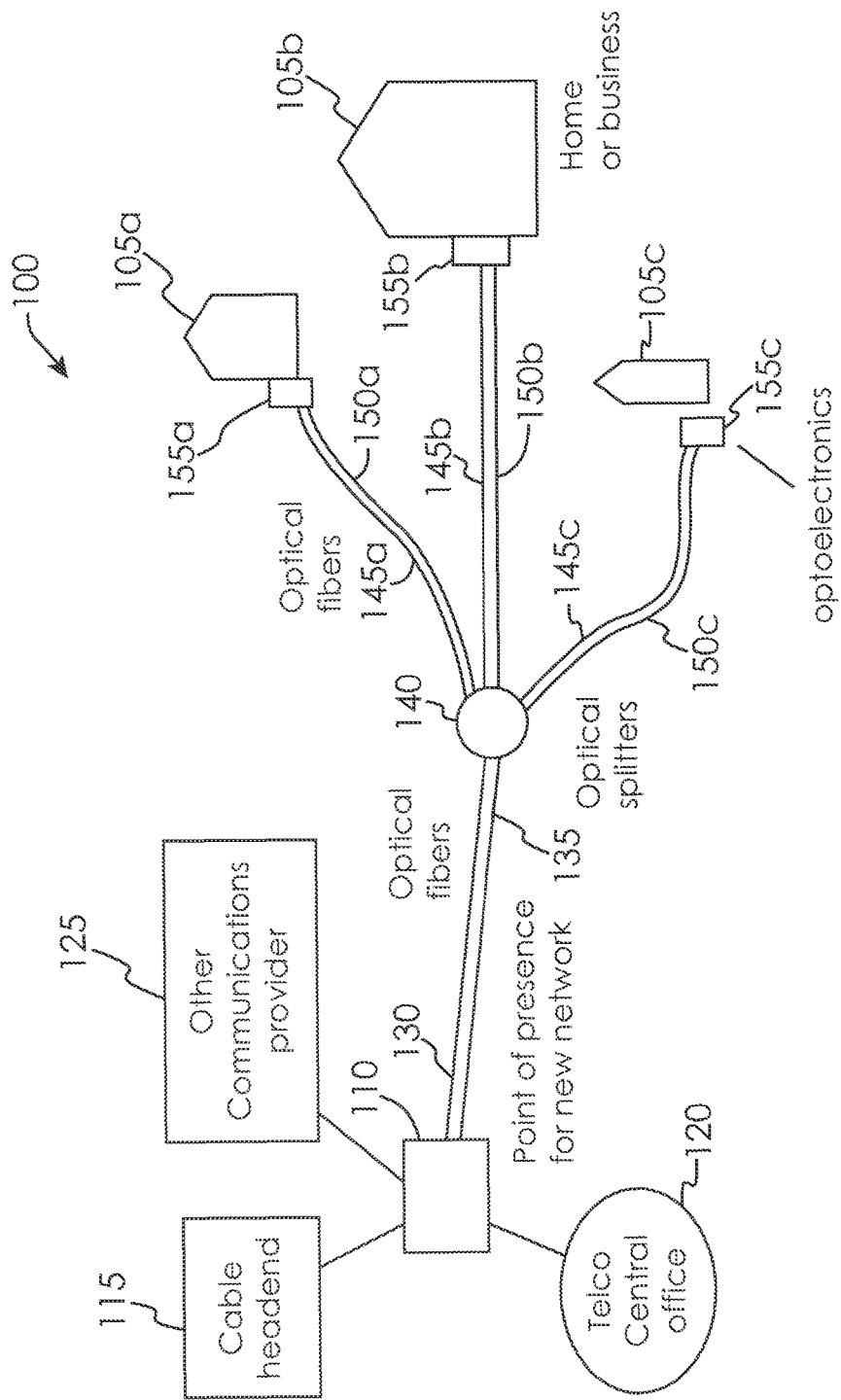
FIG. 1 is a schematic block diagram of a passive optical network for delivering telecommunications services according to one embodiment of the present disclosure.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The automatic connection and disconnection methodology described herein provides for a near real time connection or disconnection from a network that is difficult to fraudulently bypass and provides a detailed billing record related to the receipt of individual services provided by a telecommunications service provider over the network. The billing record sent to the provider may reflect all addresses connected to the network as well as those addresses that are disconnected (from an initial connected state) or never connected during a given billing period, allowing the provider to properly track and verify customer usage.

FIG. 1 illustrates a schematic block diagram of a network 100 for providing telecommunications services to customer premises 105a,105b,105c. Customer premises 105 typically comprise a residential home or business building. As shown, services from various providers are directed to a single point of presence 110 controlled by the network operator. The services typically originate from individual service provider equipment, such as cable headend 115 and telco central office 120. Other types of provider equipment (represented by box 125) for delivering additional services may also be connected to the point of presence 110. The services originating from the provider equipment 115,120,125 may include, but are not limited to, digital television services, broadband internet data services, telephone services, digital broadcast satellite services, video-on-demand services, security system connectivity and the like.

Optical fibers 130,135 are connected between the point of presence 110 and an optical splitter 140 as shown. Additional optical fibers 145a,145b,145c and 150a,150b,150c are connected between the optical splitter 140 and interface electronics 155a,155b,155c at the individual customer premises 105. It shall be understood that the interface electronics 155 may be located inside or outside of the customer premises 105.

The portion of the network 100 between point of presence 110 and interface electronics 155 comprises what is known in the art as a passive optical network. Passive optical networks generally do not incorporate active electronic or optical devices, which can be costly to purchase and have increased power requirements. Instead, passive optical devices, such as optical splitter 140, are used to direct signals from a single optical fiber to multiple destinations. As one nonlimiting example, optical splitter 140 may route the signal from optical fiber 130 to optical fibers 145a, 145b and 145c. Likewise, the signal from optical fiber 135 may be routed to optical fibers 150a, 150b and 150c. It shall be understood that each optical splitter 140 may consist of multiple optical splitters in a single housing. For example, optical splitter 140 may contain two internal optical splitters wherein the optical fiber 130 connects to optical fibers 145a, 145b and 145c, and optical fiber 135 connects to optical fibers 150a, 150b, and 150c.

In certain embodiments, a single optical fiber path may be used transmit multiple service provider signals, as opposed to requiring a separate optical fiber for each service provider signal. For example, signals from cable headend 115 and telco central office 120 may both be transmitted over optical fiber 130 by either transmitting each signal on a different wavelength or transmitting the signals together using time division multiplexing methods.

Since no active electronic switching devices are used between the point of presence 110 and the interface electronics 155 at the user premises 105, the cost to install and operate the network 100 is reduced. However, it shall be understood that some active optoelectronic devices, such as signal repeaters or amplifiers, may be required at selected points in the network 100 in order to increase the signal strength over long fiber runs.

As used herein, the term "passive optical network" shall refer to either a single set of optically connected fibers (such as optical fibers 130, 145a, 145b and 145c) or to multiple sets of optically connected fibers and their associated transmitting, splitting and receiving devices. The present disclosure contemplates that large numbers of parallel optical branches and/or multiple tiers of optical splitters may be employed to allow maximum scalability of the network 100.

It shall be further understood that various additional mechanical and optical devices may be employed to achieve the overall connectivity and stability of the optical fibers throughout the network 100. For example, each optical fiber may actually be a series of optically joined fibers with the appropriate support devices to allow the fibers to be run over long distances and be protected from the environment. In one embodiment, parallel sets of optical fibers may be run between two connection points using a single multi-fiber cable. For example, optical fibers 145a and 150a may be run in a jacketed two-conductor fiber optic cable from optical splitter 140 to user premises 105a. Additional optical fibers may also be contained in the cable to deliver services from additional service providers to the user premises 105a or to act as spares for future additional services.

Figure 2:
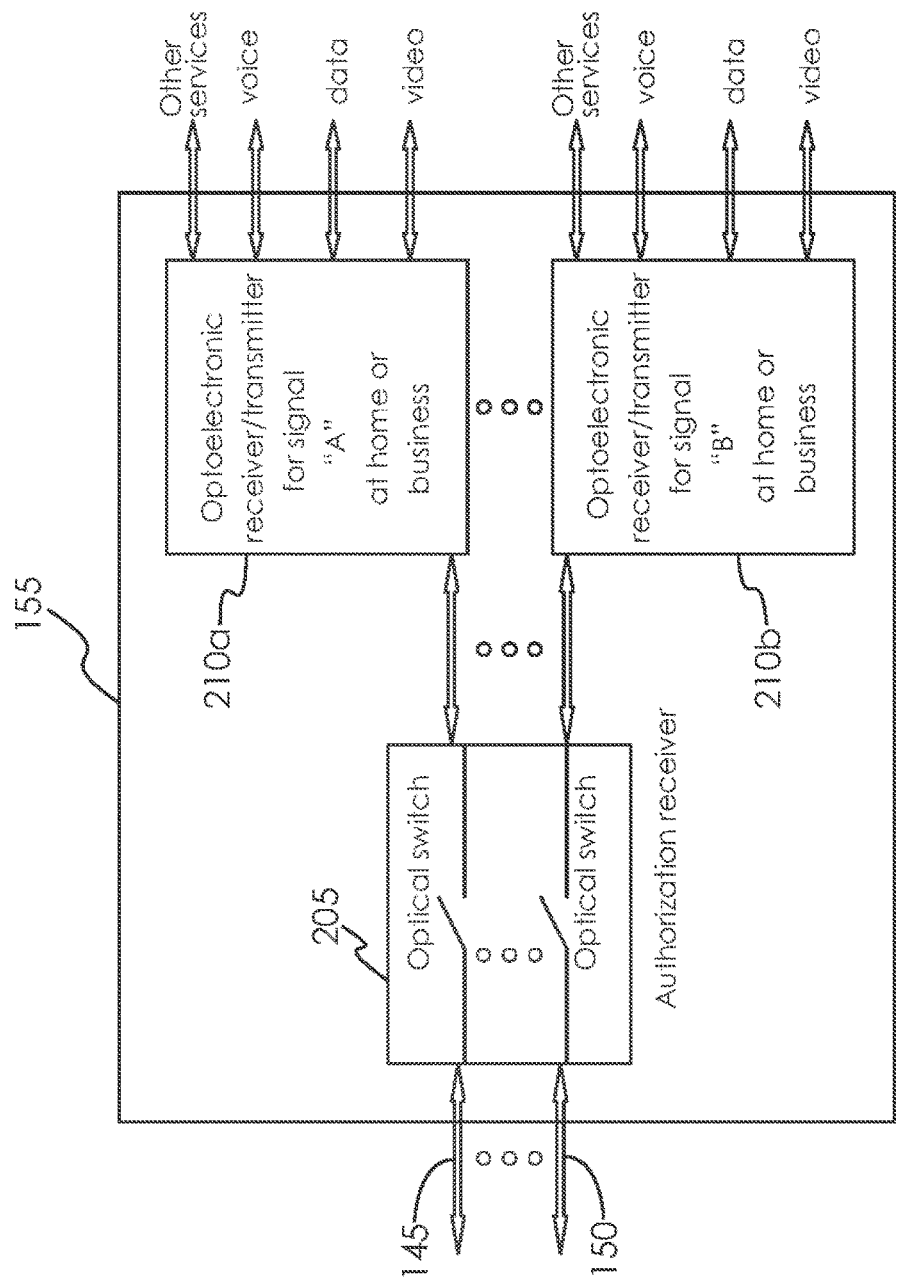
FIG. 2 is a schematic block diagram illustrating an example connection scheme for the authorization receiver and optoelectronic transceivers according to one embodiment of the present disclosure.

As shown in FIG. 2, the interface electronics 155 at the home or business may include an authorization receiver 205 which is controlled by the network operator and optoelectronics units 210a,210b which are used to received and transmit video, voice, data, and other services from various service providers. It shall be understood that while two optoelectronic units 210 are shown, any number of optoelectronic units 210 may be utilized depending on the number of service providers that are supplying services to the customer premises 105. In a preferred embodiment, a single authorization receiver 205 is used at each user premises 105. The authorization receiver 205 receives the incoming provider content signals (via optical fibers 145,150) and directs the signals to the optoelectronics units 210. Each optoelectronics unit 210 converts the associated optical provider signal into separate usable signals for the types of service being provided. For example, the optoelectronics unit 210a may separate the incoming signal from the authorization receiver 205 into individual voice, data and video signals for connection to individual devices in the user premises (e.g., telephones, computers, televisions, etc.). In other embodiments, the optoelectronics units 210 will simply convert the optical signal output by the authorization receiver 205 to an electronic signal, then direct the electronic signal to additional interface devices, such as Ethernet routers, cable modems, or television set top boxes, for connection to the individual consumer devices.

In certain embodiments, the authorization interface electronics 155 may comprise a single unit which contains the authorization receiver 205 and multiple optoelectronics units 210. In other embodiments, the authorization receiver 205 may be a separate unit, with individual optoelectronics devices 210 added depending on the number of service providers that wish to deliver services to the customer. The optoelectronics units 210 may be supplied by the network operator along with the authorization receiver 205 or may be supplied by the individual service providers.

Figure 3:
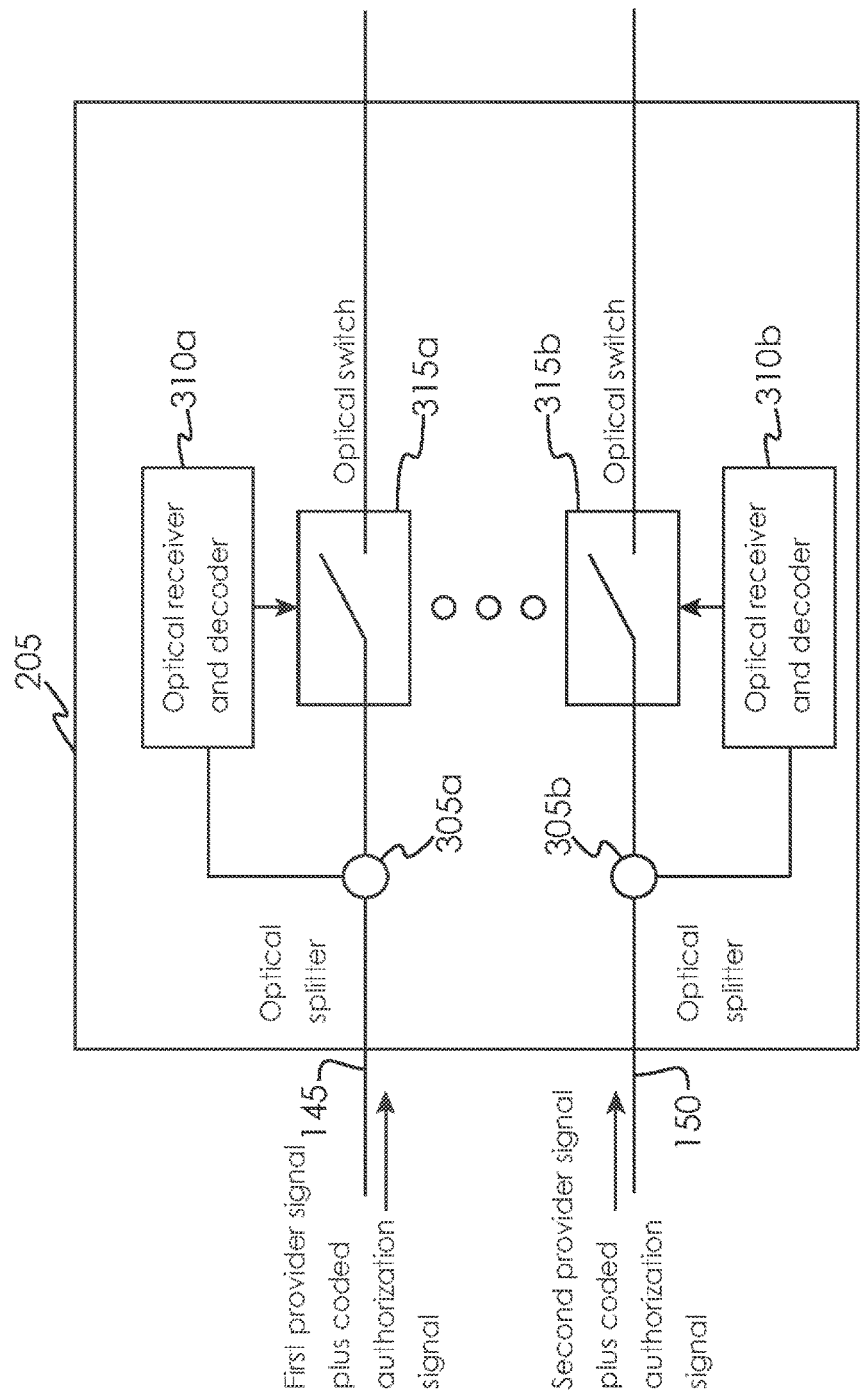
FIG. 3 is a schematic block diagram of the authorization receiver according to one embodiment of the present disclosure.

FIG. 3 shows a more detailed view of the authorization receiver 205. As shown, a signal from a first service provider is transmitted to the authorization receiver 205 via optical fiber 145 as depicted. Each incoming optical fiber 145,150 is connected to a corresponding optical splitter 305a,305b. The optical splitters 305 are each further connected to both an optical decoder 310a,310b and an optical switch 315a, 315b as shown. Each optical decoder 310 is operatively connected to an associated optical switch 315 such that the optical decoder 310 is able to control the state of the optical switch 315 depending on the presence or absence of a particular authorization code embedded within or transmitted in addition to the incoming provider content signal.

The optical decoder 310 transforms the received optical authorization signal into an electrical signal and decodes the signal. If the decoded signal contains the appropriate authorization code for the particular customer, an electronic signal is transmitted to the optical switch 315 such that the optical switch 315 enables the provider signal to be sent to the optoelectronics unit 210. Once the optical switch 205 is closed, optical fiber signals can travel in both directions to and from the user premises. The authorization signal is sent periodically to "hold" the optical circuit closed such that voice, data, video, and other services can be transmitted over the optical path.

An electronic record of the connection and disconnection of services to the individual user premises may be maintained at the point of presence 110 or other location. The electronic record preferably contains information detailing the time the authorization signal was first sent to an authorization receiver and the subscriber address associated with the authorization receiver. In certain embodiments, the point of presence 110 will record the time a "connect" authorization code was sent to an authorization receiver 205 and the time a "disconnect" authorization code was sent to the same authorization receiver 205. In other embodiments, the point of presence 130 will record the time an initial authorization code was sent to the authorization receiver 205 and the time the point of presence 130 stopped sending additional "keep alive" authorization codes. This information can then be used to provide a detailed real time or periodic billing record to each service provider using the network.

In one embodiment, the authorization code transmitted by the network provider is an eight bit binary code modulated onto a radio frequency (RF) carrier using quaternary phase shift keying (QPSK) or quadrature amplitude modulation (QAM) schemes. The RF carrier signal may be located in the path of the service provider signal, but in an area of the RF spectrum or at a wavelength that does not interfere with the services being delivered to the subscribers. Once the authorization code is modulated onto the RF carrier, it is further transformed into an optical format along with the other RF carriers within the provider signal and transmitted to the authorization receiver 205. The authorization receiver 205 converts the received optical signal back to an RF signal and demodulates the authorization code from the corresponding RF carrier. Other encoding schemes and alphanumerical formats known in the art for encoding and transmitting the authorization signal may also be used and are contemplated to be within the scope of the present disclosure.

In addition to the elements discussed above, the components of the network 100, including point of presence 110 and optoelectronics units 205, may include one or more processors, memory, storage and input/output devices. Additionally, it shall be understood that the various system components discussed herein may be incorporated into one or more other components. It shall be further understood that the system components may be located in the same physical location or in separate locations from one another. Additionally, it should be appreciated that the representation in FIGS. 1-3 are not intended to be detailed drawings showing all components of the network 100. Further, for the sake of brevity, much of the standard internal workings, processes and operations of a telecommunications network will not be described in detail herein, as they are well known to those of ordinary skill in the art.

Figure 4:
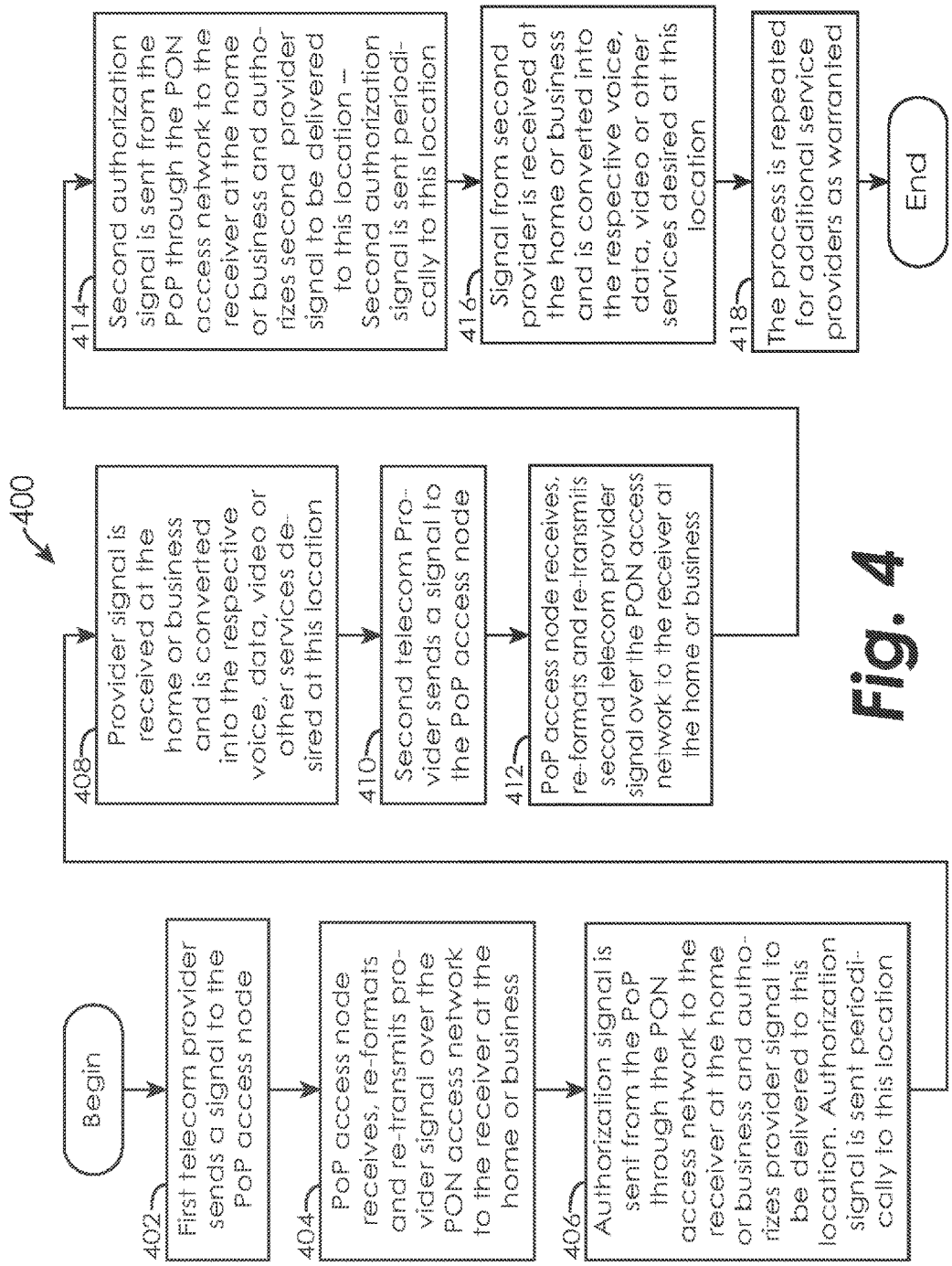
FIG. 4 is a process flow diagram illustrating a method for using a passive optical network according to one embodiment of the present disclosure.

FIG. 4 illustrates an example method 400 of providing services from multiple telecommunications service providers to subscribers over a network. The process begins at step 402 when a first service provider directs a first provider signal to the point of presence 110. Each provider signal sent to the point of presence 110 from provider equipment 115,120,125 may contain a single type of service signal (e.g., video) or multiple types of signals multiplexed together (e.g., voice, video, and data).

At step 404, the point of presence 110 receives the first provider signal, decodes it, and, if necessary, reformats it into an optical format suitable for transmission over optical fiber. It shall be understood that the individual service provider signals received by the point of presence 130 may be in a variety of formats, including non-optical and optical formats. The provider signal is then retransmitted to the optical splitter 140 over an optical fiber such as optical fiber 130. Optical splitter 140 splits and again retransmits the first provider signal to all of the interface electronics units 155 which are connected to the optical splitter 140 via optical fibers 145. It shall be understood that the provider signal may pass through additional optical splitters or other optical routing devices placed along the path between point of presence 110 and interface electronics 155.

At step 406, the point of presence 110 determines the identity of the service provider which sent the signal and further determines which of the connected user premises are authorized to receive the signal. In one embodiment, the identification of the service provider can be done by simply checking to see which hardwired port sensed the signal in the point of presence 110. In other embodiments, the point of presence can extract a provider identification code from within the provider signal. Other means of determining the provider identity may also be used and are considered to be within the scope of the present disclosure.

To determine which of the user premises are authorized to receive the provider content signal, the point of presence 110 can again extract subscriber information embedded in the provider content signal or look up the subscriber list in a separate database. It shall be understood that the database may be maintained within the point of presence 110 or in a separate server (not shown) which is in communication with the point of presence 110. It shall be further understood that the customer identification information maintained by the network operator may be limited to the individual authorization codes in order to further protect customer privacy and prevent unwanted dissemination of customer billing information.

Once the list of authorization codes are determined for a given content signal, the authorization codes are encoded into an authorization signal and transmitted over the optical fibers 130 and 145 and received by the authorization receiver 205. Each authorization receiver 205 receives and decodes the authorization signal to determine if one of the transmitted authorization codes matches an authorization code assigned to that authorization receiver 205. In one embodiment, the assigned authorization code for each individual authorization receiver 205 is set within the authorization receiver 205 before being installed at the customer premises. In other embodiments, the authorization code may be set remotely.

If the received authorization code matches that of the authorization receiver 205, the optical switch 315a is closed, allowing the first provider content signal to reach the optoelectronics unit 210a at step 408. The optoelectronics unit 210a receives the provider content signal and separates it into the individual content signals (voice, video, internet) for delivery within the user premises 105a.

In one embodiment, the optical switch 315a will remain closed for a predetermined period of time after receiving the correct authorization code, after which time it will reopen if the authorization code is not received again. In this way, periodic authorization signals will continue to be sent to the authorization receivers 205 to maintain connectivity of the provider signal. If a user cancels their service or otherwise needs to be disconnected from service, the point of presence 110 will stop transmitting the authorization code for that user's authorization receiver, causing the authorization receiver 205 to disconnect the provider content signal from the optoelectronics unit 210a. The network operator will keep track of all connections and disconnections of the provider content signal to each authorization receiver 205 and provide a detailed billing record to the service provider.

At step 410, a second service provider directs a second content signal to the point of presence 110 for delivery to one or more user premises 105. The content signal is reformatted and transmitted over a different optical fiber 135 to optical splitter 140 and further directed to authorization receivers 205 via optical fibers 150 at step 412. Again, the point of presence 110 determines the authorization codes for the authorization receivers 205 which are authorized to receive the content signal and transmits the codes as part of an authorization signal to the authorization receivers 205 (step 414). Each authorization receiver 205 which is able to decode a matching authorization code from the authorization signal then passes the provider content signal through optical switch 315b to the optoelectronics unit 210b for separation and distribution within the user premises (step 416). At step 418, the process repeats for any additional service provider signals which are being supplied over the network 100.

It shall be understood that while the provider content signal has been described as being transmitted prior to the authorization signal, other timing schemes may be implemented and are considered to be within the scope of the present disclosure. For example, the authorization code signal or pulse may be transmitted regardless of whether a specific content stream is being transmitted by the service provider at a given time. In other embodiments, as described above, a "keep alive" authorization signal may be sent at periodic intervals to prevent the authorization receiver 205 from disconnecting the content signal from the user premises. In still further embodiments, the authorization receiver 205 will close the optical switch 315 upon receiving a matching authorization code and leave it closed until a separate "disconnection" code is received.

It shall be further understood that signals may be transmitted in both directions between the point of presence 110 and the user premises 105. For example, voice signals and internet email or browsing data will also need to be passed from the user premises 105 to the point of presence 110. Because the same optical fiber is used to facilitate transmission in both directions, the optical switch 315 will also prevent such transmission when necessary. In certain embodiments, the point of presence 110 may require the authorization receiver 205 to send an acknowledgement signal back to the point of presence 110 indicating that the correct authorization code was received and/or indicating the current state of each switch 315 within the authorization receiver 205.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A network for delivering telecommunication services, the network comprising:
   a passive optical network;
   a point of presence maintained by a network provider for receiving service provider signals from at least two service providers, the point of presence being configured to:
   transmit a first service provider signal from a first service provider over the passive optical network;
   transmit a second service provider signal from a second service provider over the passive optical network;
   determine, at the point of presence, an identity of at least one of the first service provider or the second service provider;
   determine, at the point of presence, at least one subscriber premises authorized to receive at least one of the first service provider signal or the second service provider signal, wherein the point of presence determines the at least one subscriber premises authorized to receive at least one of the first service provider signal or the second service provider signal, by extracting subscriber information embedded in at least one of the first service provider signal or the second service provider signal;

encode; at the point of presence, a first authorization signal for the first service provider signal, the first authorization signal comprising one or more first authorization codes;

encode, at the point of presence, a second authorization signal for the second service provider signal, the second authorization signal comprising one or more second authorization codes;

transmit the first authorization signal, including the one or more first authorization codes; and transmit the second authorization signal, including the one or more second authorization codes; and a plurality of optical receivers in communication with the point of presence over the passive optical network and configured to receive the first service provider signal and the second service provider signal, each of the plurality of optical receivers being associated with a different subscriber premises of the at least one subscriber premises, the plurality of optical receivers comprising a first optical receiver associated with a first subscriber premises, the first optical receiver being configured to:

receive, from the point of presence, the first authorization signal and the second authorization signal;

determine, based on the first authorization signal and the second authorization signal, which of the first service provider signal or the second service provider signal the first subscriber premises is authorized to receive; and receive the authorized service provider signal.

2. The network of claim 1, wherein the passive optical network comprises at least two optical fiber paths connecting each one of the plurality of optical receivers to the point of presence;

wherein the first service provider signal is transmitted from the point of presence to the plurality of optical receivers over a first optical fiber path; and wherein the second service provider signal is transmitted from the point of presence to the plurality of optical receivers over a second optical fiber path.

3. The network of claim 1, wherein the first optical receiver further is in communication with an optoelectronics unit which separates each one of the first service provider signal and the second service provider signal into separate telecommunications signals for use by individual consumer devices at the first subscriber premise.

4. The network of claim 3, wherein each one of the separate telecommunications signals comprises at least one signal selected from a group consisting of: a video signal, a voice signal, or a broadband internet signal.

5. The network of claim 3, wherein the optoelectronics unit is integral with the first optical receiver.

6. The network of claim 1, wherein detecting that the first subscriber premises is authorized to receive the first service provider signal comprises comparing the one or more first authorization codes with a stored authorization code stored in the first optical receiver to detect a matching authorization code that matches the stored authorization code.

7. The network of claim 6, wherein:

the first optical receiver allows the first service provider signal to remain connected for a predetermined period of time once the matching authorization code is detected.

8. The network of claim 1, wherein each one of the one or more first authorization codes and each one of the one or more second authorization codes comprises an eight bit binary code.

9. The network of claim 1, wherein each one of the one or more first authorization codes and each one of the one or more second authorization codes is modulated onto a Radio frequency (RF) carrier using at least one of quadrature phase shift keying (QPSK) and quadrature amplitude modulation (QAM) schemes before being converted to an optical format.

10. The network of claim 1, wherein the passive optical network comprises at least one optical splitter for directing the first service provider signal to the first subscriber premises and the second service provider signal to a second subscriber premises, the first subscriber premises and the second subscriber premises being different subscriber premises.

11. A method for providing telecommunication services over a network, the method comprising:

maintaining, by a network provider, a point of presence for receiving service provider signals from at least two service providers;

transmitting, from the point of presence and over a passive optical network, a first service provider signal from a first service provider;

transmitting, from the point of presence and over the passive optical network, a second service provider signal from a second service provider over the passive optical network;

determining, at the point of presence, an identity of at least one of the first service provider or the second service provider;

determining, at the point of presence, at least one subscriber premises authorized to receive at least one of the first service provider signal or the second service provider signal, wherein the point of presence determines the at least one subscriber premises authorized to receive at least one of the first service provider signal or the second service provider signal, by extracting subscriber information embedded in at least one of the first service provider signal or the second service provider signal;

encoding, at the point of presence, a first authorization signal for the first service provider signal, the first authorization signal comprising one or more first authorization codes;

encoding, at the point of presence, a second authorization signal for the second service provider signal, the second authorization signal comprising one or more second authorization codes;

transmitting, from the point of presence, the first authorization signal, including the one or more first authorization codes;

transmitting, from the point of presence, the second authorization signal, including the one or more second authorization codes;

receiving at a first optical receiver at a first subscriber premises, the first authorization signal and the second authorization signal from the point of presence;

determining, based on the first authorization signal and the second authorization signal, which of the first service provider signal or the second service provider signal the first subscriber premises is authorized to receive; and receiving the authorized service provider signal.

12. The method of claim 11, wherein the passive optical network comprises at least two optical fiber paths connecting a plurality of optical receivers to the point of presence;

wherein the first service provider signal is transmitted from the point of presence to the plurality of optical receivers over a first optical fiber path; and wherein the second service provider signal is transmitted from the point of presence to the plurality of optical receivers over a second optical fiber path.

13. The method of claim 11, wherein the first optical receiver further is in communication with an optoelectronics unit which separates each one of the first service provider signal and the second service provider signal into separate telecommunications signals for use by individual consumer devices at the first subscriber premise.

14. The method of claim 13, wherein each one of the separate telecommunications signals comprises at least one signal selected from a group consisting of: a video signal, a voice signal, or a broadband internet signal.

15. The method of claim 13, wherein the optoelectronics unit is integral with the first optical receiver.

16. The method of claim 11, wherein determining that the first subscriber premises is authorized to receive the first service provider signal comprises comparing the one or more first authorization codes with a stored authorization code stored in the first optical receiver to detect a matching authorization code that matches the stored authorization code.

17. The method of claim 16, wherein:
the first optical receiver allows the first service provider signal to remain connected for a predetermined period of time once the matching authorization code is detected.

18. The method of claim 11, wherein each one of the one or more first authorization codes and each one of the one or more second authorization codes comprises an eight bit binary code.

19. The method of claim 11, wherein each one of the one or more first authorization codes and each one of the one or more second authorization codes is modulated onto a Radio frequency (RF) carrier using at least one of quadrature phase shift keying (QPSK) and quadrature amplitude modulation (QAM) schemes before being converted to an optical format.

20. The method of claim 11, wherein the passive optical network comprises at least one optical sputter for directing the first service provider signal to the first subscriber premises and the second service provider signal to a second subscriber premises, the first subscriber premises and the second subscriber premises being different subscriber premises.

* * * * *